US011511775B2

(12) United States Patent
Kain et al.

(10) Patent No.: US 11,511,775 B2
(45) Date of Patent: Nov. 29, 2022

(54) METHOD FOR THE DYNAMIC, CONTEXT-BASED DISTRIBUTION OF SOFTWARE IN A CONTROL SYSTEM OF A VEHICLE, AS WELL AS A CONTROL SYSTEM

(71) Applicant: Volkswagen Aktiengesellschaft, Wolfsburg (DE)

(72) Inventors: Tobias Kain, Oberndorf/Melk (AT); Maximilian Wesche, Edemissen (DE); Hendrik Decke, Braunschweig (DE); Julian-Steffen Müller, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 61 days.

(21) Appl. No.: 17/125,904

(22) Filed: Dec. 17, 2020

(65) Prior Publication Data
US 2021/0188314 A1    Jun. 24, 2021

(30) Foreign Application Priority Data
Dec. 19, 2019    (DE) ...................... 10 2019 220 162.8

(51) Int. Cl.
*B60W 60/00*    (2020.01)
*B60W 50/023*    (2012.01)

(52) U.S. Cl.
CPC ........ *B60W 60/007* (2020.02); *B60W 50/023* (2013.01); *B60W 60/0015* (2020.02); *B60W 2556/45* (2020.02)

(58) Field of Classification Search
CPC ......... B60W 60/60007; B60W 50/023; B60W 60/0015; B60W 2556/45; G06F 8/71
See application file for complete search history.

(56) References Cited

U.S. PATENT DOCUMENTS

2016/0142253 A1    5/2016  Steinder et al. .............. 709/221
2018/0370540 A1*  12/2018  Yousuf .................. B60W 10/20
(Continued)

OTHER PUBLICATIONS

Herrnleben, Stefan et al., "Towards Adaptive Car-To-Cloud Communication," 4th IEEE International Workshop on Pervasive Context-Aware Smart Cities and Intelligent Transport Systems, URL: http://sig-iss.work/percomworkshops2019/papers/p119-herrnleben.pdf, pp. 119-124 pages.

*Primary Examiner* — Marthe Y Marc-Coleman
(74) *Attorney, Agent, or Firm* — Slayden Grubert Beard PLLC

(57) ABSTRACT

The invention relates to a method for the dynamic, context-based distribution of program codes in a control system of a vehicle. The control system has a plurality of control apparatuses for executing the program codes. The program codes are assigned to the corresponding control apparatuses of the control system by a global placement graph. In doing so, the global placement graph is calculated in a computing unit that is located outside of the control system. The data of the global placement graph are transmitted to the control system. It is provided for the global placement graph to be calculated based on the current configuration as well as known reconfigurations, wherein the selection of the next node of the global placement graph to be calculated is calculated using the probability of occurrence of an error as well as the effect of the error.

20 Claims, 6 Drawing Sheets

(56) References Cited

U.S. PATENT DOCUMENTS

2021/0125036 A1\* 4/2021 Tremblay ................. G06N 3/08
2022/0080992 A1\* 3/2022 Yousuf ................ B60W 50/045

\* cited by examiner

METHOD FOR THE DYNAMIC, CONTEXT-BASED DISTRIBUTION OF SOFTWARE IN A CONTROL SYSTEM OF A VEHICLE, AS WELL AS A CONTROL SYSTEM

CROSS-REFERENCE TO RELATED APPLICATIONS

This application claims priority to German Patent Application No. DE 10 2019 220 162.8, filed on Dec. 19, 2019 with the German Patent and Trademark Office. The contents of the aforesaid patent application are incorporated herein for all purposes.

TECHNICAL FIELD

The invention relates to the dynamic, context-based distribution of software in a control system of a motor vehicle, a control system for performing such a method, a motor vehicle with such a control system, as well as a computer program product according to the preamble of the independent claims.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Present-day vehicles already have numerous assistance systems that help the driver in numerous driving situations supported by computer. Such assistance systems can access sensors for detecting a great deal of measured data that greatly exceed the sensory perceptions of humans. Moreover, the speed of these assistance systems significantly exceeds human reaction time. Known driver assistance systems are for example lane departure warning systems, brake assistants in the context of pedestrian recognition, and adaptive cruise controls, in particular for traffic jam situations.

Through the use of such assistance systems, the autonomy of the driver with respect to his driving decisions is increasingly being transferred to the vehicle, or respectively to correspondingly operating control units. At the end of these developments is a self-propelled vehicle that can maneuver entirely without the intervention of a human. Fully-automated passenger transportation is possible using such a self-propelled vehicle.

The driving mode of an automobile, in particular a self-propelled automobile is controlled by a driving system which, in the context of the present application, is to be understood as a control unit in the broadest sense that is specially designed and configured for this task. This control unit is designed to automatically transversely and longitudinally guide the vehicle by using a plurality of input signals, in particular sensor data detected by the vehicle itself, as well as received communication data. Such controlling of automated transverse and longitudinal guidance poses complex calculation requirements on the driver assistance system which generally possesses algorithms, models and control functions for this purpose that are at least partially based on machine learning (artificial intelligence).

To safely operate an autonomous automobile, numerous software applications are required that interact with each other. However, the problem is that errors such as for example in the context of the software application or a computing node can cause some applications to no longer be executable. Depending on the importance of the application, this may have dramatic consequences for the safety of the passengers and other road users.

To prevent the dramatic consequences of errors that arise, the software applications may be redundantly executed in different computing nodes. The idea is that the redundant instances are executed in a passive mode. This means that they execute the same procedures as the active instances, but however do not interact with the executing systems.

Depending on the functional relevance of the corresponding function, this could lead to uncontrolled driving situations, a loss of comfort up to an endangerment of the passengers in the autonomously driving motor vehicle. It is known to redundantly design safety-relevant systems in order to reliably avoid hazardous driving situations.

The job of determining the assignment between instances of applications and computing nodes is nontrivial. The decision depends on many different parameters. For example, computing nodes only possess a limited amount of computing and memory resources. On the other hand, each application requires a certain amount of resources in order to function as planned. To ensure that all applications can be executed in the computing nodes installed in the vehicle, a multidimensional and complex application placement problem must be solved.

Hazardous situations from software or hardware errors can, as already noted, be (partially) prevented by redundant software design. The introduction of redundant application instances however increases the complexity of the application placement problem since additional parameters must be taken into account. For example, the minimum number of redundant instances can be indicated for each application. Moreover, the minimum degree of hardware segregation can be defined for each application. This parameter indicates the minimum number of different computing nodes in which the instances of the application must be executed. In this case, the number of available control units and the requirement for minimum hardware segregation with respect to the programs leads to a distribution problem.

Since the number of software applications that are necessary to operate an autonomous vehicle is rather high (approximately several applications are affected), numerous valid assignments between computing nodes and the application instance generally exist. However, not all valid assignments are equally "good". To select the best possible mapping, an optimization target must be formulated. The optimization target can for example be formulated so that mappings which enable as many computing nodes as possible to be shut down, give preference to those mappings that use all computing nodes with which the vehicle is equipped. In addition to this optimization target, various other target functions are conceivable that take into account other criteria.

When there is a malfunction of the control system from the failure of a sensor, a control unit or an error in a program code, a reconfiguration of the software in the different control units of the control system may be necessary to be able to reliably execute the functions of the control systems again.

SUMMARY

An object exists to improve the process of reconfiguration in a necessary reconfiguration of the software in a control system, and thereby minimize the required computing power and energy consumption in the motor vehicle.

This object is solved by a method for the dynamic, context-based distribution of program codes in a control system of the vehicle according to the independent claims(s).

Embodiments of the invention are discussed in the dependent claims and the following description.

The details of one or more embodiments are set forth in the accompanying drawings and the description below. Other features will be apparent from the description, drawings, and from the claims.

DESCRIPTION

Figure 1:
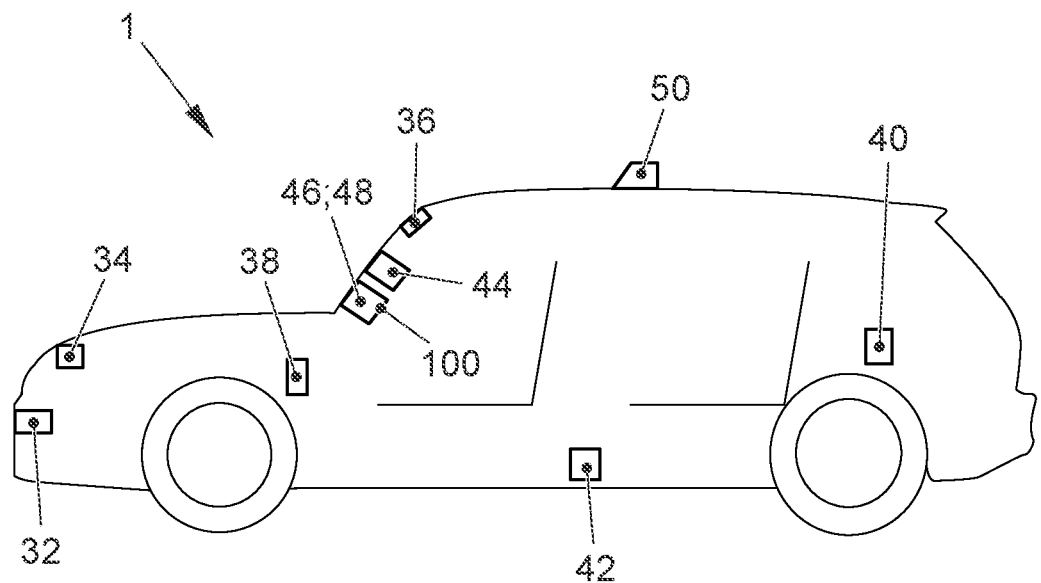
FIG. 1 shows a schematic representation of a system consisting of a motor vehicle according to an embodiment with sensors and a control apparatus for performing an at least partially autonomous driving mode of the motor vehicle.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

According to a first exemplary aspect, a control system has a plurality of control apparatuses for executing program codes. The program codes are assigned to the corresponding control apparatuses of the control system by a global placement graph. In doing so, the global placement graph is calculated in a computing unit that is located outside of the control system. The data of the global placement graph are transmitted to the control system. In the present aspect, the global placement graph is calculated based on the current configuration as well as known reconfigurations, wherein the selection of the next node of the global placement graph to be calculated is calculated using the probability of occurrence of an error as well as the effect of the error. This allows a relocation plan to be calculated for distributing the executed program codes to the control units that provides a precalculated alternative distribution graph for the likely worst-case faults and failures so that a relocation can occur when a safety-relevant control unit and/or a safety-relevant program code fails. In doing so, the dynamic optimization may occur outside of the motor vehicle in a computer center, for example in a cloud computer system, so that the control units of the motor vehicle are freed up.

The dependent claims discuss embodiments of the method presented in the independent claim for the dynamic, context-based distribution of software in a control system of a motor vehicle.

In some embodiments of the method, several classes are formed for the probability of occurrence and the effect of the error, wherein the error is assigned to a probability of occurrence and an effect class. By subdividing the probability of occurrence and the error effect into different classes, the potential system faults may be easily weighted. Accordingly, corresponding replacement distribution plans may first be calculated for the failure of critical functions, whereas the relocation may be correspondingly prioritized as lower for errors with error effects that are not safety-relevant. Accordingly, the safety level of the system may be further increased in the event of a failure of a control unit and/or an error in executing a program code.

For example, the probability of occurrence and the effect of the error are weighted and specified, wherein depending on the weighting, the node of the global placement graph is calculated that has the highest weighting factor. In doing so, an easily quantifiable weighting factor may be ascertained by the weighting, wherein the node of the global placement graph with the highest weighting factor is calculated first.

For example the weighting factor may be determined as a product of a multiplication of the probability of occurrence and the error effect. Accordingly, both the occurrence as well as the effect of an error may be taken into consideration when selecting the next node to be calculated.

In some embodiments, four different classes are provided for the error effect. This may ensure that minor errors or errors without any relevance to safety are weighted correspondingly less, and life-threatening errors are weighted correspondingly greater. In doing so, a sufficient gradation between the individual error types is possible through four classes.

In some embodiments, a first error class describes an error without a risk of injury, a second error class describes an error with a slight risk of injury, a third error class describes an error with serious injuries, and a fourth error class describes an error that may lead to life-threatening injuries.

Furthermore and in some embodiments, the probability of occurrence is subdivided into at least four different categories, wherein the subdivision of the probability of occurrence in conjunction with the effect of an error enables improved weighting of potential errors.

Furthermore and in some embodiments, a corresponding matrix may be formed by at least four classes for the probability of occurrence and at least four classes for the error effect, said matrix enabling easy qualification and weighting of the errors and error consequence so that the particular node of the global placement graph is calculated that covers the potentially greatest risk.

Some embodiments provide checking whether an assignment plan is already available for the control system for assigning the remaining active program codes to the available control units in the event of a failure of a control apparatus or an error in executing a program code. Complex and energy-intensive recalculations for optimally distributing the active program codes to the control apparatuses may thereby be omitted. Accordingly, the computing power of the control system may be used entirely for the autonomous driving mode, whereby a higher target achievement level and therefore a greater safety reserve may be provided.

Some embodiments provide checking whether an assignment plan is already available for the control system for assigning the remaining active program codes to the available control units in the event of a failure of a control apparatus or an error in executing a program code. Accordingly, when there is an emergency plan consisting of the central placement graph, a reconfiguration of the control system may be quickly implemented. In the event that an emergency plan has not yet been provided by the global placement graph at the moment, a corresponding solution may be calculated locally that may then be shared with similar motor vehicles through an upload to the computer center. Accordingly, the central placement graph may be further optimized based on the failure events in some embodiments.

Furthermore and in some embodiments, it is provided that the control system is operated in an emergency mode, and an assignment plan is created when a sufficient number of redundant program codes needed to perform an autonomous driving mode is executed. For example, the driving speed may be limited, and other vehicle functions, for example comfort functions of the motor vehicle, may be restricted in order to prioritize and ensure safety-relevant functions.

In some embodiments, the motor vehicle is brought to a standstill by a failsafe system and/or is guided to the closest safe stopping point when the minimum number of redundantly executed program codes has been undershot. Generally, braking the motor vehicle to a standstill leads to a defusing of the situation. In certain driving situations, for example in an unlit tunnel, on the highway, for example in a highway construction site, a standstill of the motor vehicle may however lead to a hazardous traffic situation. In this case, it is possible that the failsafe system may at least continue autonomously driving the motor vehicle far enough until a safe stopping place for the motor vehicle is reached and traffic-endangering situations are avoided.

In some embodiments, the global placement graph is ascertained based on information of a server, information of a mobile telephone, information from road site units and/or other traffic information systems in different control systems of similar motor vehicles. In doing so, the computing power may be provided by the vehicle-external computing elements, and the control system of the motor vehicle may be relieved. This may reduce the energy requirement of the motor vehicle and increase the range. Furthermore, solutions may be precalculated by a vehicle-external calculation before a corresponding error occurs in a motor vehicle so that when the error occurs, a corresponding plan for dynamically arranging the executed program codes in the remaining control units may be provided.

Another exemplary aspect relates to a control system comprising a plurality of control apparatuses, wherein the control system is configured to execute a method for operating a motor vehicle driving at least partially autonomously in case a plurality of machine-readable program codes are executed by at least two control apparatuses of the control system. The method may corresponding to the method of the first exemplary aspect and/or one or more of its embodiments.

A vehicle performing the method according to the first aspect furthermore has a driving system configured for the automatic driving mode of the vehicle. The driving system is for example configured to longitudinally and/or transversely guide the vehicle in a fully automated manner. To accomplish this, the driving system for example accesses a plurality of sensor data detected by the vehicle, as well as communication data received by the vehicle. The driving system is for example designed to execute driver assistance functions up to fully automated driving. To accomplish this, the driving system has control algorithms that are at least partially based on machine learning and for example may have target functions and/or neural networks. To operate the driving system, function data are also required that for example have parameters of a neural network or optimized function parameters. These function data may, e.g., be saved in the driving system of the vehicle as a function data record. At the beginning of the method, a (relative) first function data record is always saved in the driving system of the vehicle.

A vehicle performing the method according to the first aspect furthermore may have a control unit. This control unit may for example be configured to communicate with the other components of the vehicle, such as with the first communication module and with the driving system, as well as possibly with sensors, and to coordinate their functions. The control unit further for example has a memory, or controls it.

In some embodiments, the scope of functions of the driving system expands as the license level of the vehicle increases. In other words, the degree of automation of the driving mode expands as the license level of the vehicle increases. For example, the license levels of the vehicle are correlated with various levels of autonomous driving. For example, a vehicle in a delivered state has a license level of 0. For example, the license level of 0 corresponds to a level 0 degree of automation ("driver only"), according to which the driver continuously performs longitudinal and transverse guidance, and the driving system does not actively intervene in the driving mode.

In some embodiments, license level 1 corresponds to a level 1 degree of automation ("assisted"), according to which a driver permanently takes over longitudinal or transverse guidance, and the driving system takes over each of the other functions. For example, license level 2 corresponds to a level 2 degree of automation ("partially automated"), according to which a driver must permanently monitor the vehicle, and the driving system takes over longitudinal and transverse guidance in a specific application.

For example, license level 3 corresponds to a level 3 degree of automation ("highly automated") according to which a driver does not have to continuously monitor the vehicle but however must be potentially capable of taking over the control of the vehicle. According to the level 3 degree of automation, the driving system also takes over longitudinal and transverse guidance in a specific application and furthermore independently recognizes limits of the driving system and, with a sufficient time reserve, asks the driver to take over control. License level 4 for example corresponds to a level 4 degree of automation ("fully automated"), according to which no driver is needed in a specific application, and the driving system fully autonomously handles the situation in a specific application.

For example, license level 5 corresponds to a level 5 degree of automation ("driverless"), according to which no driver is needed from the beginning to the end of a trip, and the driving system entirely takes over the task of driving in all applications. The above definitions correspond to the "five levels of autonomous driving" as defined by the German Association of the Automotive Industry (VDA). The particular application includes road types, a speed range and environmental, or respectively environmental conditions.

Another exemplary aspect relates to a vehicle, in particular a passenger vehicle, with an internal combustion engine, electric motor or hybrid motor for performing the steps of the method according to the teachings herein. To accomplish this, the vehicle has at least sensors for detecting environmental data, by means of which the control apparatuses of the control system are supplied with data for the autonomous driving mode.

Another exemplary aspect relates to a computer program comprising a program code for performing the steps of a method for operating an at least partially autonomously driving motor vehicle when the program code of the computer program is executed on a computer.

The method steps may be implemented by electrical or electronic parts or components (hardware), by firmware (ASIC), or achieved by executing a suitable program (software). For example, the method may be achieved or respectively implemented by a combination of hardware, firmware, and/or software. For example, individual components for carrying out individual method steps are designed as a separately integrated circuit or arranged on a joint integrated circuit. Individual components configured to perform individual method steps furthermore may be arranged on a (flexible) printed circuit carrier (FPCB/PCB), a tape carrier package (TCP), or another substrate.

The individual method steps are for example designed as one or more processes that run on one or more processors in one or more electronic computing devices and are created when executing one or more computer programs. In this case, the computing devices are for example designed to work together with other components, for example a communication module, as well as one or more sensors, or respectively cameras, to achieve the functionalities described here. The instructions of the computer programs are for example stored in a memory such as for example a RAM element. The computer programs may however also be stored on a non-volatile storage medium such as for example a CD ROM, a flash memory, or the like.

A person skilled in the art will see that the functionalities of multiple computers (data processing devices) may be combined or may be combined in a single device or that the functionality of a specific data processing device may be distributed on a plurality of devices to execute the steps of the method without deviating from the scope of this invention.

The various embodiments mentioned in this application may be combined with one another, unless designed otherwise in individual cases.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic representation, in particular a block diagram, of an exemplary motor vehicle 1, in particular a two-track vehicle with an internal combustion engine, electric or hybrid motor. The motor vehicle 1 comprises a plurality of first sensors, in particular a first sensor 32, a second sensor 34, and a third sensor 36. The first sensors 32, 34, 36 are configured to detect environmental data of the motor vehicle 1 and for example comprise a camera for detecting an image of an environment directly surrounding the motor vehicle 1, distance sensors such as for example ultrasonic sensors or LIDAR, for detecting distances to the objects surrounding the motor vehicle 1. The first sensors 32, 34, 36 transmit the environmental signals detected by them to control units 12, 14, 16, 18 of a control system 10 of the motor vehicle 10.

The motor vehicle 1 furthermore has a plurality of second sensors, in particular a fourth sensor 38, a fifth sensor 40 and a sixth sensor 42. The second sensors 38, 40, 42 are sensors for ascertaining status data relating to the motor vehicle 1 itself such as for example current position and movement information of the motor vehicle 1. The second sensors are consequently for example speed sensors, acceleration sensors, inclination sensors, sensors for measuring an insertion depth of a shock absorber, wheel speed sensors, or the like. The second sensors 38, 40, 42 transmit the status signals detected by them to the control units of the motor vehicle 1. In particular, the second sensors 38, 40, 42 transmit their measuring results directly to a control unit 12, 14, 16, 18 of the control system 10 of the motor vehicle 1.

The motor vehicle 1 further has the control system 10 that is configured for the completely autonomous driving mode, in particular longitudinal and transverse guidance, of the motor vehicle 1. The control system 10 has a navigation module 64 that is configured to calculate routes between a starting and a target point, and to ascertain the maneuvers to be performed along this route by the motor vehicle 1. The navigation module 44 is for example configured to perform specific maneuvers of the motor vehicle 1 such as for example parking and unparking maneuvers. Moreover, the control system 10 comprises an internal memory 66 that communicates with the navigation module 44, for example via a suitable data bus. In particular, a model, a neural network and/or a target function are saved on the internal memory 46 that are at least partially based on machine learning. Furthermore, function data for the model, the neural network and/or the target function are saved in the internal memory 46 as a function data record. The functionality of the control system 10 is for example controlled by a control unit and particularly depending on a license level of the motor vehicle 1.

The control system 10 is configured to perform the steps of the motor vehicle 1 in the method according to some embodiments. In this case, the control system 10 correspondingly performs the steps of the method by means of the control units 12, 14, 16, 18, or controls the other components of the motor vehicle 1. For this purpose, the control units 12, 14, 16, 18 for example each have an internal memory 46 and a CPU 48 which communicate with each other, for example via a suitable data bus. Moreover, the control units 12, 14, 16, 18 of the control system 10 are in a communicating connection with at least the first sensors 32, 34, 36 and the second sensors 38, 40, 42, and possibly other control apparatuses of the motor vehicle 1, for example to control the heater or air conditioning system of the motor vehicle, a radio, navigation system or other information or entertainment systems. The communication is carried out for example through one or more particular CAN connections, one or more particular SPI connections, or other suitable data connections. A communication interface is configured in the motor vehicle 1 for sending and receiving data with an external computer center 64.

Figure 2:
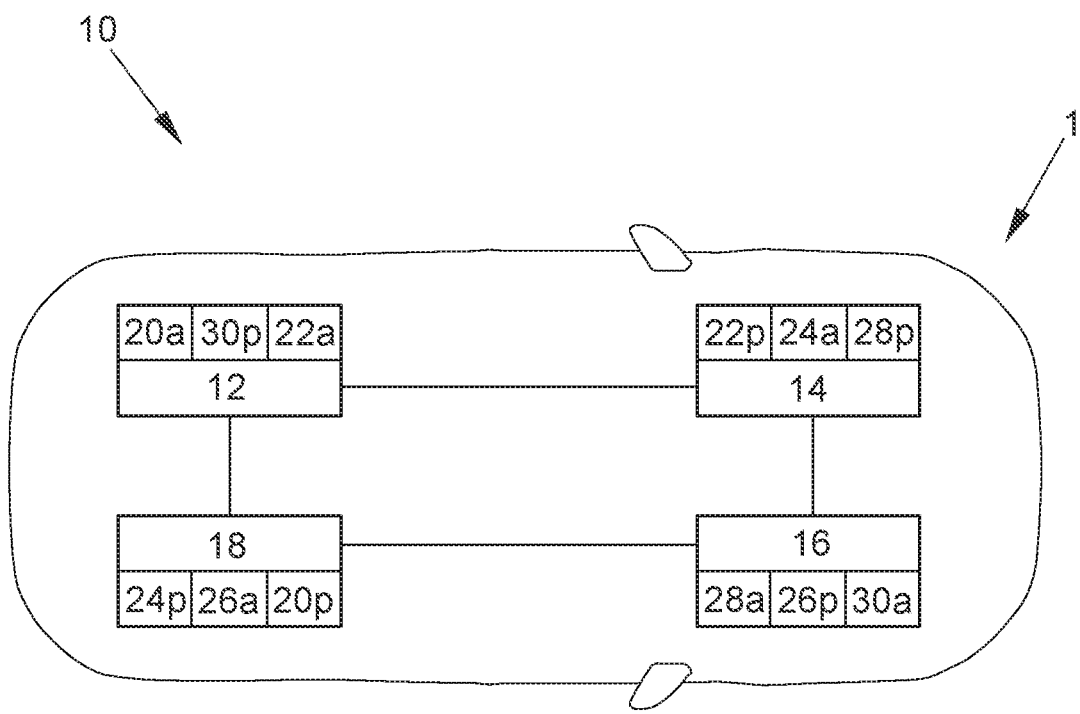
FIG. 2 shows a control system with a plurality of control units that execute a plurality of program codes for controlling an at least partially autonomous driving mode according to some embodiments.

FIG. 2 shows a schematic configuration of a control system 10 for controlling an at least partially autonomous, for example fully autonomous, motor vehicle 1. The control system 10 comprises four control units 12, 14, 16, 18, of which at least one program code 20, 22, 24, 26, 28, 30 is executed to perform a partially autonomous or fully autonomous driving mode of the motor vehicle 1. Each program code 20, 22, 24, 26, 28, 30 is redundantly applied to two different control units 12, 14, 16, 18. A program code 20*a*, 22*a*, 24*a*, 26*a*, 28*a*, 30*a* is actively executed by a control unit 12, 14, 16, 18 and evaluated to control the motor vehicle 1, whereas the redundant program 20*p*, 22*p*, 24*p*, 26*p*, 28*p*, 30*p* remains passive and is only integrated into the controlling of the motor vehicle 1 when the formerly active program 20*a*, 22*a*, 24*a*, 26*a*, 28*a*, 30*a* can no longer be evaluated to control the motor vehicle 1 due to an error or a failure of the particular control unit 12, 14, 16, 18.

Figure 3:
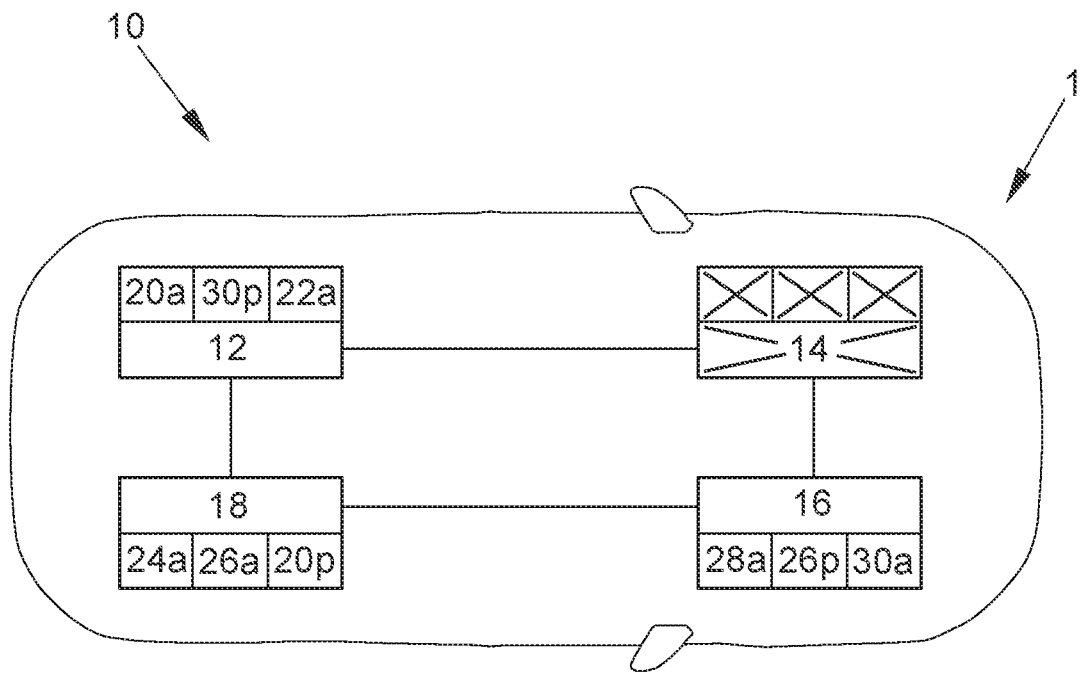
FIG. 3 shows a control system with a plurality of control units in the event of a failure of a control unit or the crashing of a program code, wherein the failed function is taken over by a redundant program code on another control apparatus according to some embodiments.

During the operation of a motor vehicle 1, the placement of the program codes 20, 22, 24, 26, 28, 30 can change several times. For example, after events such as the error of a control unit 12, 14, 16, 18 or the error of an application instance, it may be necessary to change to a new application placement. In addition to these events, the recognition of a potential optimization possibility may trigger the switchover to a new control unit 12, 14, 16, 18. FIG. 3 shows such an instance in an example of a failure of the second control unit 14. The third program code 24*a* was executed in the initial state by the second control unit 14. After a failure of this second control unit 14 or a program crash of the third program code 24*a* hitherto actively executed on the second control device 14, the third program code 24*p* is activated on the third control unit 16 and evaluated for further controlling the motor vehicle 1. Dramatic driving situations from a lack of controlling the motor vehicle 1 can thereby be avoided.

To enable an optimization of the active program codes 20*a*, 22*a*, 24*a*, 26*a*, 28*a*, 30*a*, it is necessary to recognize the current driving situation and the current performance of the control system 10. In so doing, the performance of all software applications 20, 22, 24, 26, 28, 30, all control apparatuses 12, 14, 16, 18 and other hardware, in particular the sensors 52, 54, 56, 58, 60, 62, is referenced for system reasons.

The following examples illustrate this dependency:

Let us assume that the motor vehicle 1 is an electrically driven automobile that conveys a passenger to an important meeting, and the battery of the motor vehicle 1 is almost empty. In such a situation, the goal of the timely arrival at the desired location is more important than the entertainment of the passenger. In order to increase the range of the motor vehicle 1, all applications can therefore be stopped that serve the purpose of entertainment. Consequently, some control apparatuses 12, 14, 16, 18 can be shut down, which saves energy.

Let us imagine a motor vehicle 1 that is stuck in a traffic jam. Since the motor vehicle 1 is scarcely moving, redundant instances of driving functions can be stopped. Resources are therefore released with which for example an application can be executed that helps improve the flow of traffic.

Due to a system crash, one-half of the control apparatuses 12, 14, 16, 18 installed in the motor vehicle no longer function. Since the remaining control apparatuses 12, 14, 16, 18 do not provide sufficient resources to execute all program codes 20, 22, 24, 26, 28, 30 of the applications that were executed before the crash, a new application placement plan must be calculated. The goal of placement optimization is to depict all applications that are necessary to safely bring the motor vehicle 1 to a standstill in order to ensure the safety of the passengers and other road users.

Figure 4:
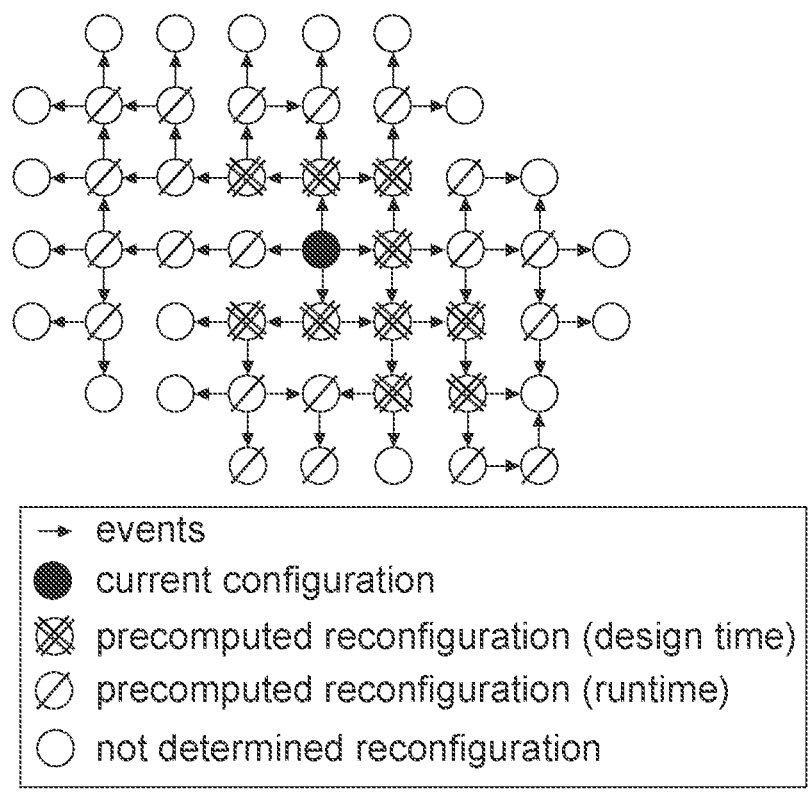
FIG. 4 shows a global placement graph for ascertaining a best-possible assignment of the executed program codes to the available control units according to some embodiments.

FIG. 4 shows a global placement graph 62 that could also be termed an assignment graph 62. In the present embodiments, a dynamic context-dependent optimization occurs by abstracting the local calculation problem of assigning the program codes 20, 22, 24, 26, 28, 30 to the particular control units 12, 14, 16, 18 in the control systems 10 of the motor vehicles 1, 80, 82, 84 to a global calculation problem. This calculation problem is solved by a computer center 64, in particular by a cloud computer system 66. As a result, a wide range of participants can help calculate the global placement graph 62 and partially shift the computing and cost-intensive task from the control systems 10 of the motor vehicle to a computing center 64. This has the benefit that motor vehicles 1, 80, 82, 84 can react faster to errors and can again quickly work in compliance with a desired ASIL level following the solution to the occurring problem.

The dynamic context-dependent placement of software in a motor vehicle moreover offers the benefit that an optimization of energy consumption is conceivable, whereby the range of an electrically-driven motor vehicle 1 can be increased.

Figure 5:
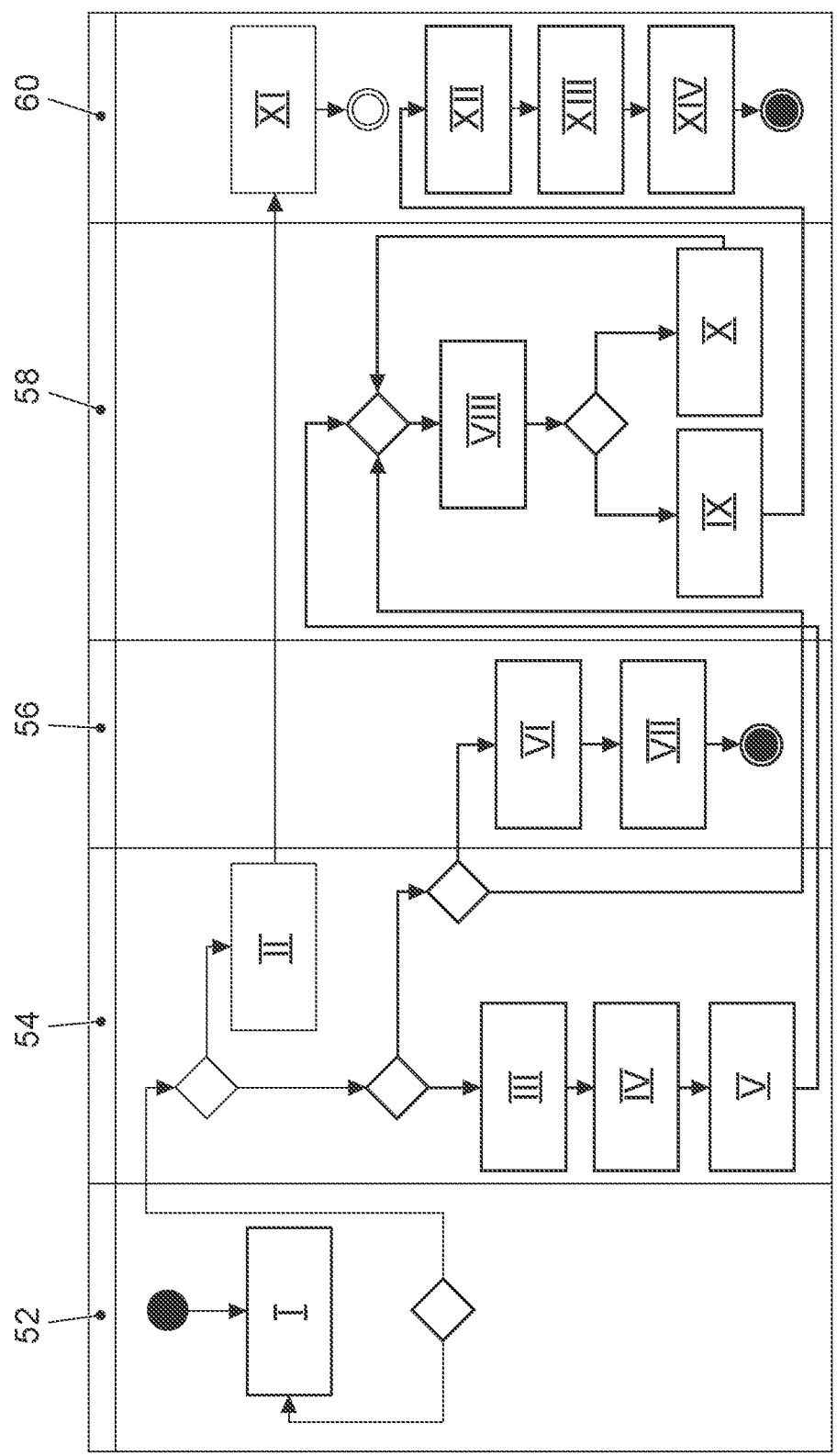
FIG. 5 shows a flowchart for monitoring the control system as well as a reconfiguration of the control system in the event of a failure of a control unit and/or an error in executing a program code according to some embodiments.

FIG. 5 show a flowchart for monitoring the control system as well as a reconfiguration of the control system in the event of a failure of a control unit and/or an error in executing a program code. The execution of the program codes 20, 22, 24, 26, 28, 30 in the control units 12, 14, 16, 18 of the control system 10 is monitored by a monitoring element 52 in a first method step I. If an error is thereby recognized, it is checked in a second method step II whether a precalculated emergency plan exists, or whether such a plan first has to be created. In the event that an emergency plan is not available at the moment that provides a precalculated dynamic assignment of the executed program codes 20, 22, 24, 26, 28, 30 to the control units 12, 14, 16, 18, it is checked in a third method step III whether a sufficient number of redundant program executions are possible to ensure a reliable autonomous driving mode. If this prerequisite is satisfied, the corresponding redundantly executed program codes are selected in a fourth method step IV and executed by a switchover element 54 on a different control unit 12, 14, 16, 18. In so doing, this new configuration is selected as the new active program code 20, 22, 24, 26, 28, 30 in a method step V.

If after a failure of a control unit 12, 14, 16, 18, a sufficient amount of computing power is no longer available to ensure a reliable, autonomous driving mode of the motor vehicle 1, an emergency mode module 56 is activated in a method step VI that assumes the system control of the control system 10. In so doing, the motor vehicle 1 is safely brought to a stop in a method step VII.

If sufficient redundancies are available, a restoration module 58 is activated that seeks to restore a software configuration on a highest possible target achievement level. To accomplish this, control units 12, 14, 16, 18 are sought in a method step VIII that have sufficient resources to additionally execute a redundant program code 20, 22, 24, 26, 28, 30. If such a control unit is found, a new redundant program code 20, 22, 24, 26, 28, 30 is executed in a method step IX in a control unit 12, 14, 16, 18. If there are insufficient free resources in the control units 12, 14, 16, 18 at the moment, program codes with a low priority are stopped in a method step X to provide additional computing power for the safety-relevant program codes.

If a precalculated emergency plan exists after the check in a method step II, this emergency plan is implemented by a placement optimizer 60 in method step XI, and the implementation is reported to the computer center 64 through the communication interface 50. If there is no emergency plan, goals for implementing an emergency plan are defined by a placement optimizer 60 in a method step XII, an optimization plan is calculated therefrom in a method step XIII, and this is implemented in a method step XIV.

Figure 6:
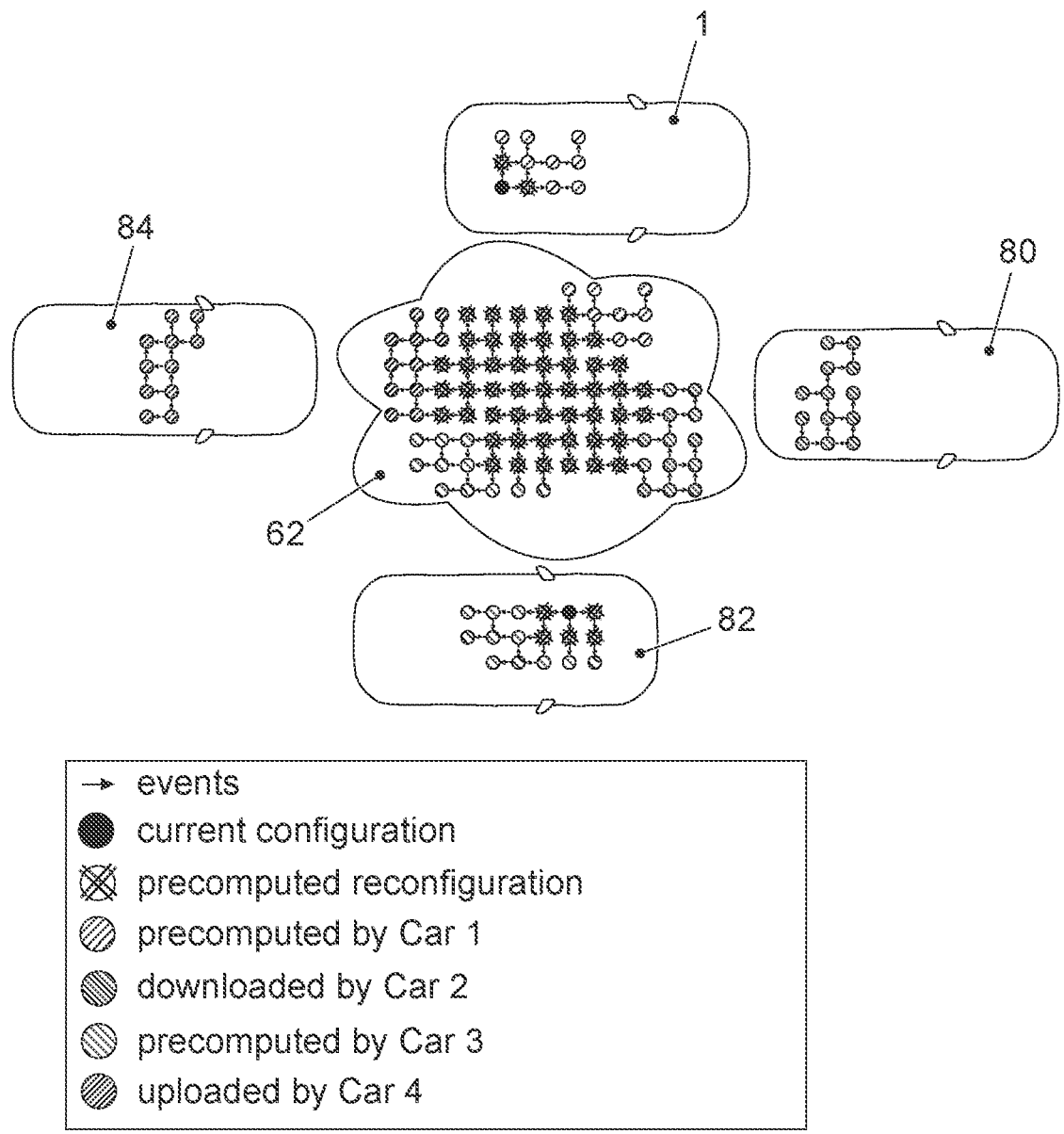
FIG. 6 shows a diagram of the communication of different motor vehicles with a central computing unit, wherein the reconfigurations executed in the motor vehicles are transmitted to the central computing unit, and/or the central computing unit transmits a best-possible reconfiguration to the motor vehicle according to some embodiments.

FIG. 6 shows the data exchange between the global placement graph calculated in the computer center 64 and the various motor vehicles 1, 80, 82, 84. In so doing, a solution graph is calculated in the first motor vehicle 1. The second motor vehicle 80 downloads the global placement graph 62 and transmits this global placement graph to the control system 10 in the second motor vehicle 80. In the third motor vehicle, another solution graph is calculated and transmitted to the computer center 64. Such a solution graph for a subproblem is uploaded by the fourth motor vehicle 84 to the computer center 64.

Figure 7:
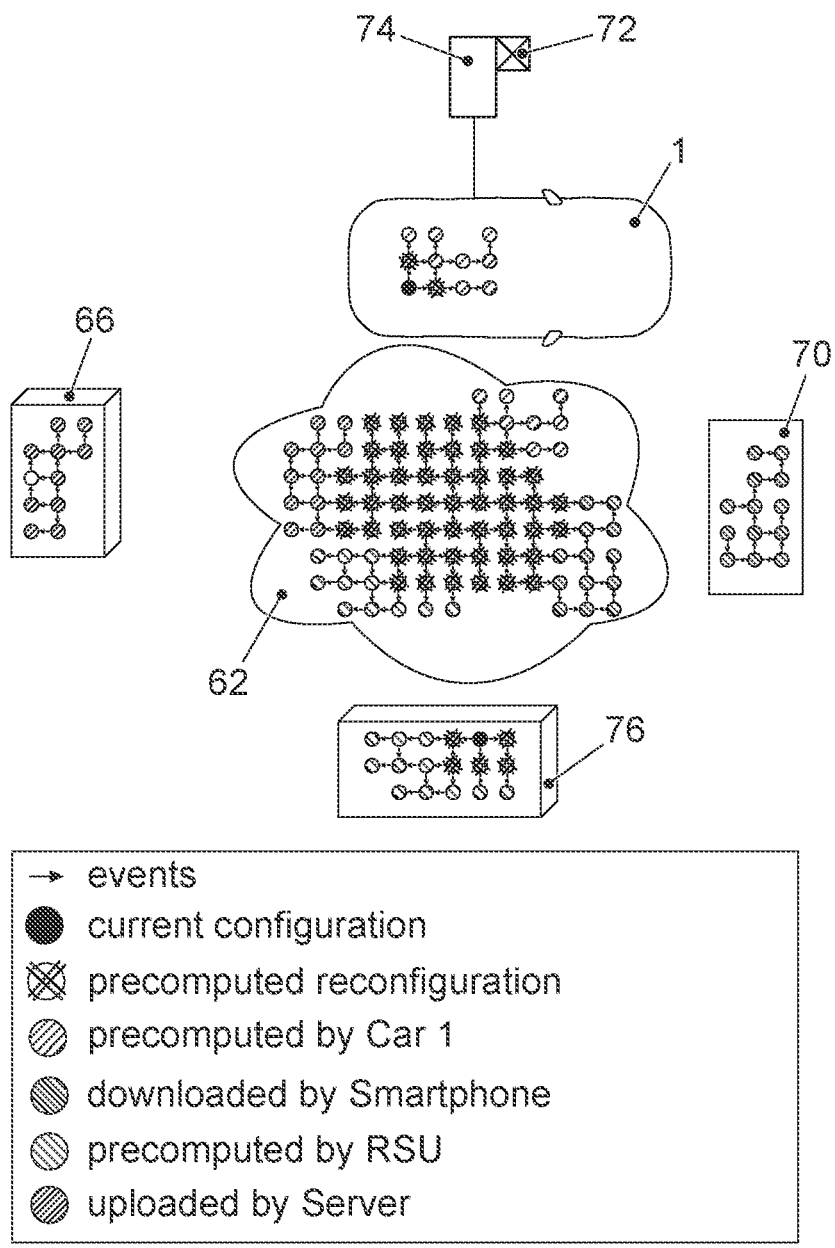
FIG. 7 shows a diagram of the communication between a central computing unit and a motor vehicle, wherein the central computing unit additionally exchanges information with other data sources according to some embodiments.

FIG. 7 shows the communication between the computer center 64 with the central placement graph 62, a motor vehicle 1, as well as additional data sources 66, 70, 76. In doing so, information provided in particular by a mobile telephone 70, a or a server 66 can be taken into account as additional data sources. Furthermore, the global placement graph 62 can be further improved by road site units 76. A solution of the central placement graph is for example transmitted to the control system 10 of the motor vehicle in a charging process by an electrically driven motor vehicle 1 to a charging station 74. This process can be initiated by a control unit 72 of the charging station 74, or by the control system 10 of the motor vehicle 1. In doing so, enough energy as well as computing power is available in an uploading process for an optimization graph to be able to be transmitted to the control system 10 of the motor vehicle 1 and implemented therein.

Figure 8:
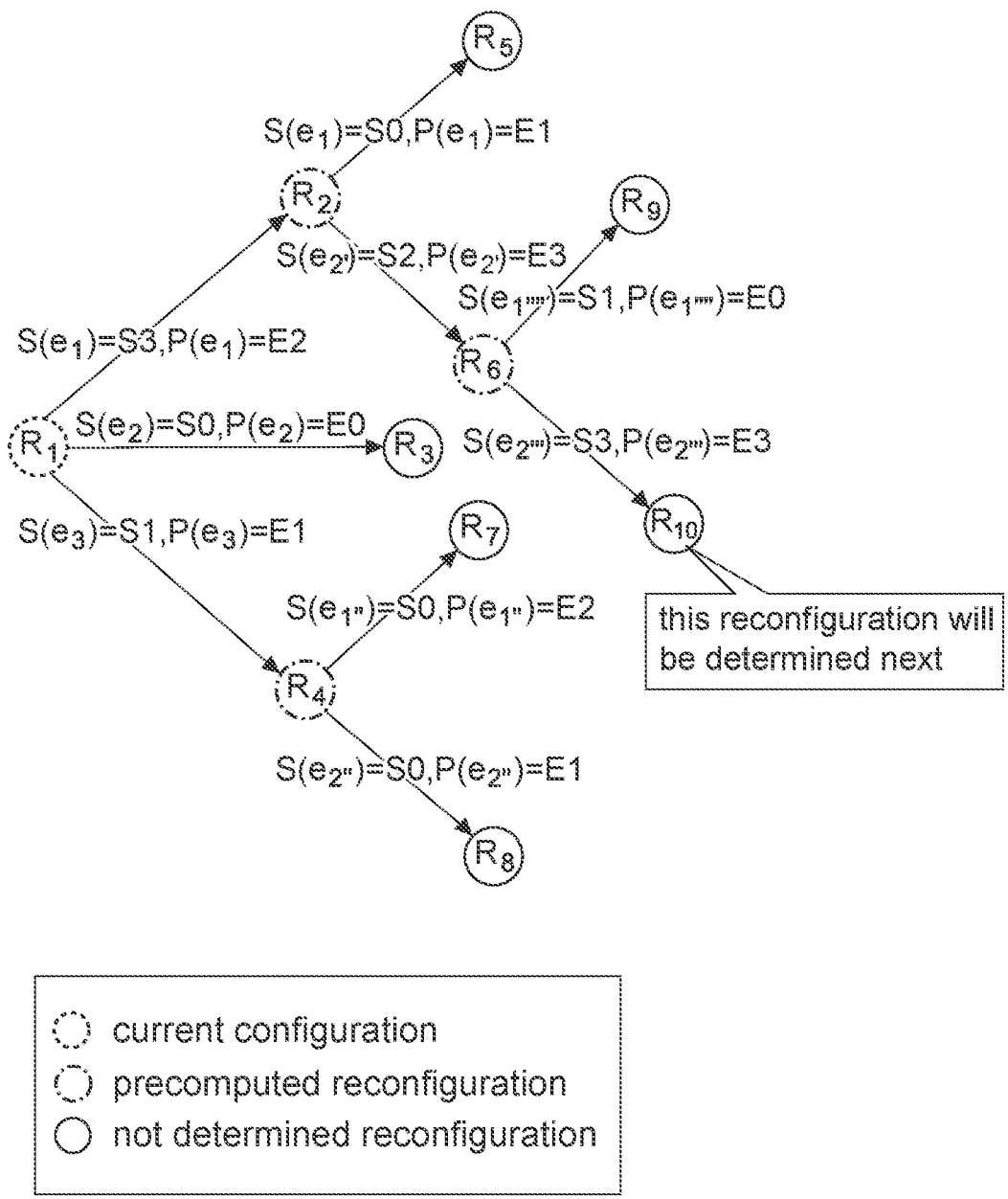
FIG. 8 shows the visualization of an optimized approach for reconfiguring the control system based on the global placement graph according to some embodiments.

FIG. 8 shows an optimized approach for calculating a global placement graph for reconfiguring a control system 10 in a motor vehicle 1.

LIST OF REFERENCE NUMERALS

1 Motor vehicle
10 Control system
12 First control unit
14 Second control unit
16 Third control unit
18 Fourth control unit
20 First program code
22 Second program code
24 Third program code
26 Fourth program code
28 Fifth program code
30 Sixth program code
32 First sensor
34 Second sensor
36 Third sensor
38 Fourth sensor
40 Fifth sensor
42 Sixth sensor
44 Navigation module
46 Internal memory
48 CPU
50 Communication interface
52 Monitoring element
54 Switchover element
56 Emergency mode module
58 Restoration module
60 Placement optimizer
62 Global placement graph
64 Computer center
66 Cloud computer system
68 Server
70 Smartphone
72 Fifth control unit
74 Charging station
76 Road site unit
78 Transceiver unit
80 Second motor vehicle
82 Third motor vehicle
84 Fourth motor vehicle
100 Computer program
R1 Current configuration
R2 Precalculated configuration
R3 Not determined configuration
R4 Precalculated configuration
R5 Not determined configuration
R6 Precalculated configuration
R7 Not determined configuration
R8 Not determined configuration
R9 Not determined configuration
R10 Configuration to be determined next The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for dynamic, context-based distribution of program codes in a control system of a vehicle, wherein the control system has a plurality of control units installed in the vehicle, wherein the program codes are assigned to the corresponding control units of the control system by a global placement graph, comprising:

calculating, by a computer that is located external of the vehicle, the global placement graph based on a current configuration of the vehicle;

transmitting, by the computer, data of the global placement graph to the control system of the vehicle; and selecting, by the control system of the vehicle, a next node of the global placement graph based on a probability of occurrence of an error as well as an effect of the error; and in case that the error occurs, operating at least one control unit of the plurality of control units that corresponds to the selected next node of the global placement graph.

2. The method of claim 1, wherein several classes are formed for the probability of occurrence and the effect of the error, wherein the error is assigned to a probability of occurrence and an effect.

3. The method of claim 2, wherein the probability of occurrence and the effect of the error are weighted and specified, wherein depending on the weighting, the node of the global placement graph is calculated that has a highest weighting factor.

4. The method of claim 3, wherein the weighting factor is determined as a multiplication of the probability of occurrence and the effect.

5. The method of claim 4, wherein four different classes are provided for the error effect.

6. The method of claim 4, wherein the probability of occurrence is subdivided into at least four different categories.

7. The method of claim 3, wherein four different classes are provided for the error effect.

8. The method of claim 3, wherein the probability of occurrence is subdivided into at least four different categories.

9. The method of claim 2, wherein four different classes are provided for the error effect.

10. The method of claim 9, wherein the error effect is subdivided into errors without a risk of injury, errors with a slight risk of injury, errors with serious injuries, and errors with life-threatening injuries.

11. The method of claim 2, wherein the probability of occurrence is subdivided into at least four different categories.

12. The method of claim 1, wherein the probability of occurrence is subdivided into at least four different categories.

13. The method of claim 1, wherein a monitoring element is provided that monitors an execution of the program code and/or a functioning of the control apparatuses, wherein in the event of a failure of a control apparatus or an error in a program code, the program codes are redistributed to the control units based on the global placement graph.

14. The method of claim 1, wherein it is checked whether an assignment plan is already available for the control system for assigning remaining active program codes to the available control units in the event of a failure of a control apparatus or an error in executing a program code.

15. The method of claim 1, wherein the control system is operated in an emergency mode, and an assignment plan is created when a sufficient number of redundant program codes needed to perform an autonomous driving mode is executed.

16. The method of claim 1, wherein the motor vehicle is brought to a standstill by a fail safe system and/or is guided to a closest safe stopping point when a minimum number of redundantly executed program codes has been undershot.

17. The method of claim 1, wherein the global placement graph is ascertained based on different control systems in similar motor vehicles, information of a server, information of a mobile phone, information from road site units and/or other traffic information systems.

18. A control system comprising a plurality of control apparatuses, wherein the control system is configured to perform the method of claim 1 when a plurality of machine-readable program codes is executed by at least two control units of the control system.

19. A motor vehicle having a control system configured to perform the method of claim 1.

20. A non-transitory storage medium comprising a computer program with a program code for performing the steps of a method of claim 1 when the program code is executed on a computer.

* * * * *